Figure 1:
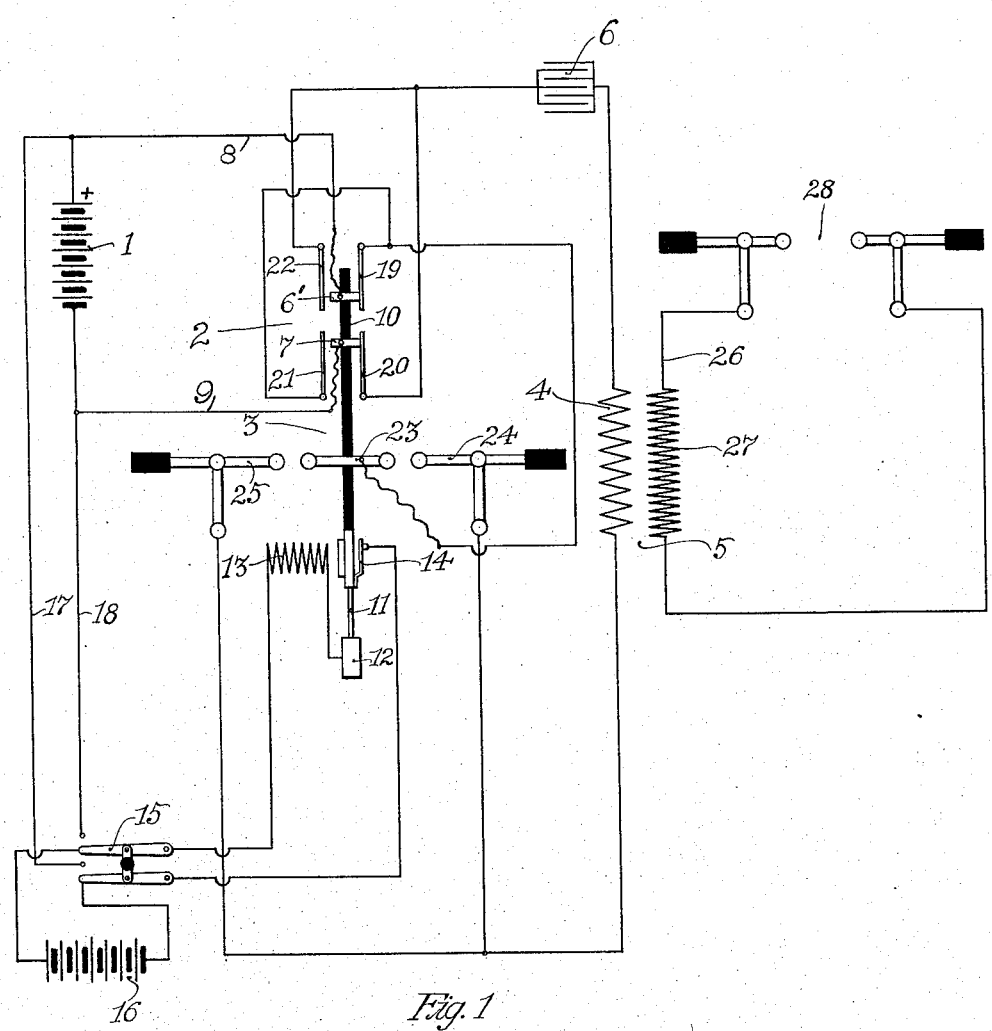

C. I. ZIMMERMAN, DEC'D.
J. G. ZIMMERMAN, SPECIAL ADMINISTRATOR.
METHOD AND MEANS FOR THE PRODUCTION AND CONTROL OF CURRENT IMPULSES.
APPLICATION FILED MAY 17, 1915.

1,173,630.

Patented Feb. 29, 1916.
2 SHEETS—SHEET 1.

Inventor
Clarence I. Zimmerman Dec'd
James G. Zimmerman Adm'r
By Brown, Hanson & Boettcher
Attys.

C. I. ZIMMERMAN, DEC'D.
J. G. ZIMMERMAN, SPECIAL ADMINISTRATOR.
METHOD AND MEANS FOR THE PRODUCTION AND CONTROL OF CURRENT IMPULSES.
APPLICATION FILED MAY 17, 1915.

1,173,630.

Patented Feb. 29, 1916.

2 SHEETS—SHEET 2.

Inventor
Clarence I. Zimmerman Dec'd
James G. Zimmerman Adm'r
By Brown, Hanson & Boettcher
Attys.

UNITED STATES PATENT OFFICE.

CLARENCE I. ZIMMERMAN, DECEASED, LATE OF MADISON, WISCONSIN, BY JAMES G. ZIMMERMAN, SPECIAL ADMINISTRATOR, OF MILWAUKEE, WISCONSIN.

METHOD AND MEANS FOR THE PRODUCTION AND CONTROL OF CURRENT IMPULSES.

1,173,630. Specification of Letters Patent. Patented Feb. 29, 1916.

Application filed May 17, 1915. Serial No. 28,554.

*To all whom it may concern:*

Be it known that CLARENCE I. ZIMMERMAN, late a citizen of the United States residing at Madison, in the county of Dane and State of Wisconsin, deceased, did invent a certain new and useful Improvement in Methods and Means for the Production and Control of Current Impulses, of which the following is a full, clear, concise, and exact description, reference being had to the accompanying drawings, forming a part of this specification.

This invention relates to a method and means for the production and control of current impulses. According to this invention it is possible to create and control in a circuit containing a source of current, current impulses of a very much higher potential than that of the source which furnishes the current for these impulses, without the aid of means external to the circuit in which these impulses travel.

This invention also teaches a method of passing current impulses through a load device by charging a static condenser through the load device from a source of current, then disconnecting the circuit and discharging the condenser through the load device in series with the source of current.

By the employment of this invention there may be obtained twice the energy value per impulse from the same source of current as compared with other systems in which the condenser is separately charged to the voltage of the source of current, and then discharged from that potential only. Where a source of unidirectional current is employed, this advantage of making only half the number of breaks in the circuit cuts down the wear on contact parts and allows greater efficiency and economy of operation of the apparatus. It is also possible to obtain twice the voltage in the working circuit as compared with other methods.

In the parent application Serial No. 514,548, filed August 25th, 1909, which was copending with the present application but which now has matured into Patent No. 1,139,623, from which the present case is in part divisional, there is claimed more particularly means for the production and control of high voltage impulses.

In the present application, there is claimed more particularly the method of production of waves from any type of current source and also the means for the production and control of current impulses from a source of constant current.

Figure 2:
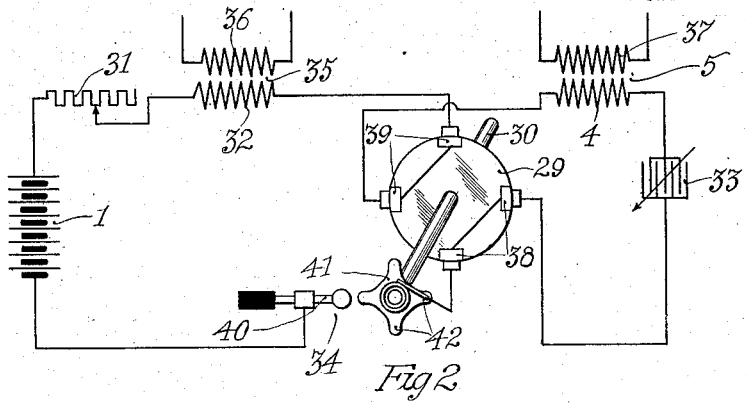
Figure 3:
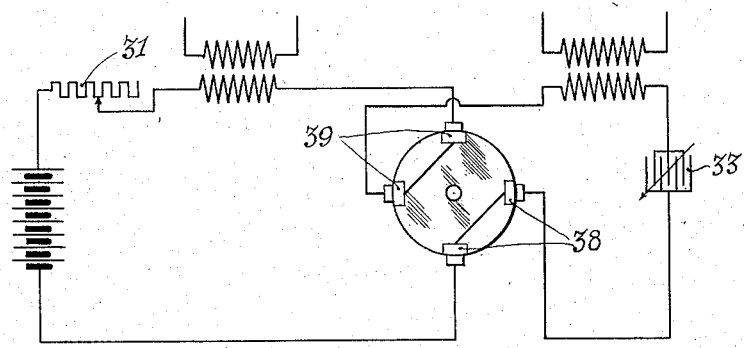
Figure 4:
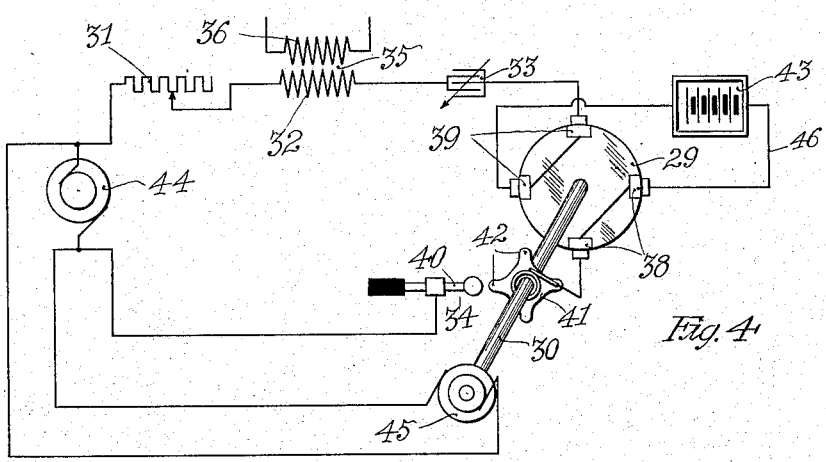

In the accompanying drawings, which form a part of the present specification, Figure 1 is a diagrammatic representation of a system embodying the principles of this invention; Fig. 2 is a diagram of a system similar to that shown in Fig. 1, of a system for producing direct or alternating current impulses in a translating or load device; Fig. 3 is a diagram of a similar system in which the impulses produced in the translating or load device are of alternating current or direct current; Fig. 4 is a diagram of a system in which impulses of direct current or of alternating current may be produced in a load device from alternating currents.

In Fig. 1, is employed a source of constant direct current for supplying the current for generating impulses in the main circuit. The battery 1 is connected through the pole-changer 2 and the service terminals or spark-gap mechanism 3, and through the load device 4 which in this case is the primary winding of a transformer 5 to the condenser 6. The pole-changer 2 comprises the battery contacts 6' and 7 which are connected by wires 8 and 9 respectively to the battery 1. The battery terminals 6' and 7 are mounted upon the insulating switch arm 10 which is mounted by means of the spring 11 upon a fixed post 12 and is adapted to be actuated as a rheotome or vibrator by means of the electromagnetic coil 13 and series circuit breaker 14. These parts are connected to a suitable source of current 16 by the double-pole double-throw switch 15. The vibrator mechanism 13, 14 may be connected to the source of current 1, if desired, as by means of the switch 15 and wires 17 and 18.

The battery contacts 6' and 7 play between fixed spring contacts 19 and 20 on one side and similar contacts 21 and 22 on the other side. Contacts 20 and 22 are connected together to the one terminal of the condenser 6, the other terminals 19 and 21 being connected together and to the common spark-gap terminal 23, which is fixed to the pole-changer switch arm 10 and moves in unison therewith. The stationary spark-gap terminals 24 and 25 which are adjustable to set the spark-gaps properly are connected together and through the load device 4 to the other terminal of the condenser 6. Suitable resistance may be included in series with the main circuit to control the electrical characteristics thereof. The secondary circuit 26 comprises the secondary winding 27 of the transformer 5 and working device 28 which, in this case, is shown as an adjustable spark-gap.

The operation of the device shown in Fig. 1 is as follows: Assume that the switch 15 connects the source of current 16 to the vibrators 13 and 14. The coil 13 attracts the armature mounted upon the spring 11 and breaks the contact at 14. This deënergizes the coil 13 and the spring 11 brings the arm which bears the contacts 6' and 7 of the main battery 1 and the spark-gap terminal 23 back to the point where the contact 14 will again be closed. The operation is then repeated continuously, the insulating arm being thrown first to the right and then to the left in regular sequence, depending upon the mechanical periodicity of the system and the strength of attraction of the magnet 13. When the arm 10 is moved to the right, as shown in Fig. 1, the battery 1 will be connected to the terminals 19 and 20 and the common spark-gap terminal 23 will be brought close enough to the stationary contact 24 to allow of a discharge of current across the gap 23, 24. It is to be noted in this connection that contact is first made between contacts 6' and 19 and 7 and 20 before the terminals 23 and 24 are brought close enough together to allow of a discharge to pass across the air-gap. As soon as a flow of current is established across the air-gap, current will flow into the condenser 6 until the same is fully charged. This requires but a very brief time, depending of course upon the constants of the circuit. As soon as the condenser is charged, current will cease to flow automatically. This action sends a very sharp impulse of current through the transformer winding 4 to charge the condenser 6. As the switch arm 10 swings to the left, the spark terminal 23 will be withdrawn from the range of the terminal 24 so that even if the return motion of the contact arm is quick enough to be started while a discharge is still passing across the gap 23, 24, the same will be broken at this point prior to breaking of the connection at the contacts 6', 19 and 7, 20. Contact will thereafter be made between the contacts 6', 22 and 7, 21 and thereafter the common contact 23 will be brought within the range of the contact 25 so that a discharge under the combined potential of the battery 1 and the condenser 6, which has now been connected to the circuit in the reverse direction, will occur. The function of the pole-changer 2 is to disconnect the circuit and reconnect it in such a manner that the condenser 6 will be discharged in series with the source 1 so that the voltages of the two devices are added together. The discharge that passes between the terminal 23 and the terminal 25 is not due solely to discharge of the condenser 6, but consists first of the discharge of the condenser 6 in series with the battery and then discharging of the condenser in the opposite direction to the potential of the battery, after which the flow of current would automatically cease. If, as previously assumed, the movement of the arm 10 in its vibration is so rapid as to start to move back to its right-hand position, prior to cessation of the discharge across the gap 23, 25, the terminal 23 will be moved out of the range of the terminal 25 before the circuit is broken at the contacts 6', 22 and 7, 21. It will now be clear that the pole-changer is employed to reverse the connection and the spark-gap mechanism is employed to break the circuit and to take the wear of the discharges thereacross.

It can be seen that the pulsations of current flowing through the primary winding 4 of the transformer 5 are of an alternating character, due to the fact that this winding is included in a series circuit on the condenser side of the pole-changer 2. It will be seen from this that the impulses of current generated in the secondary winding 27 in transformer 5 will be alternating in character and the voltage impressed upon the spark-gap 28 will be an alternating voltage.

In Fig. 2, there is shown a system employing a rotary pole-changer switch, 29, which may be driven at any desired speed by means of the shaft 30. The working circuit includes the source of current 1, an adjustable resistance 31, a load device 32, the pole-changer 29, load device 4, adjustable condenser 33, and spark-gap 34 in series relation. The load device 32 consists of a primary winding of a transformer 35, the secondary 36 of which may be connected to any suitable translating device which requires impulses of direct current. The load device 4 consists of a primary winding of the transformer 5, the secondary 37 of which may be connected to any translating device which employs impulses of current sent in alternate directions. The rotary pole-changer 29 comprises a disk of insulating material bearing quartered contacts connected together in pairs as shown at 38 and 39. Four impulses of current are sent at each revolution of the pole-changer 29. The spark-gap 34 comprises the adjustable electrode 40 which is relatively stationary and the rotating electrode 41 which has four coöperating electrode terminals 42 connected to one side of the circuit in series therewith. As the shaft 30 which drives the rotary pole-changer 29 and the arms 42 of the electrode 41 rotate, the current will be reversed by the pole-changer in that part of the circuit containing the winding 4 of the transformer 5 and the adjustable condenser 33. The contacts 38 and 39 are of such width and are so timed with respect to the arms 42 of the electrode 41 that contact will be made before the corresponding arm 42 is brought within the radius of action of the stationary electrode 40 of the spark gap 34, and that the corresponding arm 42 will be moved away from the radius of action of the stationary contact 40 before the circuit will be broken at the contact 38 or 39. If desired, the spark-gap 34 may be dispensed with if it is deemed advisable to break the circuit at the contacts 38 and 39, as shown in Fig. 3. The rotary pole-changer 29 may be made up cheaply and may be renewed and hence the spark-gap 34 may be dispensed with. It is to be noted, however, that the movement of the arm 42 away from the electrode 40 changes the electrical constants of the circuit and hence may be of value where it is desired to control the character of the discharge in the circuit.

In Fig. 4, there is shown a scheme embodying this invention whereby it is possible to obtain impulses of direct current or impulses of alternating current from a source of alternating current. The alternating current generator 44 is connected in series with the adjustable resistance 31 and the load device 32 through the condenser 33 through the pole-changer 29 and the spark-gap 34. The shaft 30 which is connected to the electrode 41 and to the pole-changer 29 is driven in sychronism with the frequency of the current generated by the alternator 44 by means of a sychronous type of motor 45. A load device 43, such as may employ impulses of direct current may be placed in the loop 46 in series with the main circuit. There is shown a storage battery 43, the charging of which may be accomplished from the source of alternating current 44.

It is possible to charge a storage battery of a very considerably higher voltage than the voltage of the source 44 by means of the system shown. The amount of energy input may be controlled by controlling the capacity of the adjustable condenser 33 by changing the resistance of the circuit and by changing the duration of contact made at the contacts 38 and 39.

Systems constructed in accordance with the teachings of my invention are susceptible of a wide range of control. For instance in the system shown in Fig. 2, considering only the load device 32 to be in operation, and it is to be remarked at this point that the system may be constructed with either of the load devices 32 or 4, connected solely in the circuit, the number of impulses per second may be controlled by controlling the speed of the shaft 30. The energy per impulse may be controlled by properly adjusting the condenser 33 and the amount of energy appearing in the secondary winding 36 may be controlled by changing the number of transformer turns. The energy output may also be controlled by adjusting the resistance and inductance of the circuit.

For certain classes of work, such as gas-engine ignition, the timing of the discharge should be accurate. In the system constructed according to this invention, the timing of the discharge is susceptible of very accurate determination and adjustment.

It is to be noted that no damage can be done to the system by short circuiting the secondary device, since the same is safeguarded by the condenser, and the maximum amount of current that can flow will be determined by the maximum amount that can be passed through the condenser at that speed. When the shaft 30 is revolving at a constant speed the amount of energy that passes in a given time may be very accurately determined in view of the fact that the energy per impulse may also be accurately determined.

The impulses which are generated may also be controlled by controlling the constant of the circuit. That is to say, the character of the discharge may be controlled by varying the resistance, the inductance and the capacity. The condition for an oscillatory discharge will be that the square of the resistance will be less than $$\frac{4L}{C}.$$

The deadbeat condition of discharge will obtain when $$R^2 = \frac{4L}{C}$$

and the logarithmic discharge will occur when $R^2$ is greater than $$\frac{4L}{C}.$$

It can be seen from the foregoing that there is provided a method and means for controlling electrical impulses which is highly advantageous and susceptible of application to a great many uses. The adaptability of the above systems to the production of radiant energy will be obvious.

It is not intended to limit the invention to the exact structures shown but it is desired that the appended claims be given a liberal interpretation in view of the pioneer nature of this invention.

What is claimed as new and desired to protect by Letters Patent of the United States is the following:

1. The method of causing a flow of current through a load device which consists in connecting a source of current to a condenser through said load device, then breaking said closed circuit connection, then reconnecting said circuit, such that the condenser will be discharged and recharged in sequence by a single impulse of current flow.

2. The method of causing a flow of current through a load device which consists in connecting a source of current to a condenser through said load device, then breaking said connection and reëstablishing the connection in such manner that the condenser will be discharged and recharged through said load device by a single impulse of current flow without further interruption of said circuit.

3. The method of causing a flow of current through a load device which consists in connecting a source of current to a condenser through said load device, then breaking said connection and reëstablishing the connection in such manner that the condenser will be discharged and recharged through said load device by a single impulse of current flow without further interruption of the circuit, and then breaking said circuit.

4. The method of causing a flow of current through a load device which consists in connecting a source of current to a condenser through said load device, then breaking said connection and reëstablishing the connection in such manner that the polarity of the condenser will be reversed at the moment of connection with respect to said source of current, whereby the condenser will be discharged and recharged through said load device.

5. The method of causing a flow of current through a load device which consists in connecting a source of current to a condenser through said load device, then breaking said connection and reëstablishing the connection in such manner that the polarity of the source of current with respect to the condenser will be reversed at the moment of connection, such that the condenser will be discharged and recharged through said load device.

6. The method of causing a flow of current through a load device which consists in connecting a source of current to a condenser through said load device, then breaking said connection of the condenser and reëstablishing the connection in such manner that the polarity of the condenser with respect to the load device and the source is reversed at the moment of re-connection, such that the condenser will be discharged and recharged through said load device without further interruption of said circuit.

7. The method of causing a flow of current through a load device which consists in connecting a source of unidirectional current to a condenser through said load device, then breaking said connection and reëstablishing the connection with said source and said load device in such manner that the condenser will be discharged and recharged through said load device without further interruption of said circuit.

8. In a translating system, a source of electric energy, a pole-changing switch in series with said source for directing current intermittently from such source through a circuit connected therewith, an inductive device in the circuit, and a spark-gap and condenser in the circuit for modifying the effect of the intermittent current upon the inductive device, such spark-gap adapted to relieve the pole-changer contacts of wear due to arcing.

9. In a translating system, a source of electric energy, a pole-changing switch in series with said source for directing current intermittently from such source through a circuit connected therewith, an inductive device in the circuit, and a spark-gap and condenser in the circuit for modifying the effect of the intermittent current upon the inductive device, such pole-changer adapted by its operation to vary the length of such spark-gap.

10. In a translating system, a source of electric energy, a pole-changing switch in series with said source for directing current intermittently from such source through a circuit connected therewith, an inductive device in the circuit, and a spark-gap and condenser in the circuit for shortening the current impulses sent through the circuit by the pole-changer, such pole-changer adapted by its operation to vary the length of such spark-gap to further shorten such impulses.

11. In a translating system, a source of electric energy, a pole-changing switch in series with said source for sending alternating impulses of current from such source through a circuit connected therewith, an inductive device in the circuit, and two spark-gaps and a condenser in the circuit for increasing the maximum effect of such inductive device.

12. In a translating system, a source of electric energy, a pole-changing switch in series with said source for sending alternating impulses of current from such source through a circuit connected therewith, an inductive device in the circuit, and two spark-gaps and a condenser in the circuit for increasing the maximum effect of such inductive device, one of such spark-gaps adapted to be traversed by the positive impulses and the other by the negative impulses of current flowing in the circuit.

13. In a translating system, a source of electric energy, a pole-changing switch in series with said source for sending alternating impulses of current from such source through a circuit connected therewith, an inductive device in the circuit, and two spark-gaps and a condenser in the circuit for shortening the current impulses sent through the circuit by the pole-changer, one of such spark-gaps adapted to be traversed by the positive impulses and the other by the negative impulses of current flowing in the circuit.

14. In a translating system, a source of electric energy, a pole-changing switch in series with said source for sending alternating impulses of current from such source through a circuit connected therewith, an inductive device in the circuit, and two spark-gaps and a condenser in the circuit for shortening the current impulses sent through the circuit by the pole-changer, one of such spark-gaps adapted to be traversed by the positive impulses and the other by the negative impulses of current flowing in the circuit, such pole-changer adapted by its operation to lengthen such gaps when the current is traversing them to further shorten such current impulses.

15. In a translating system, a source of electric energy, a pole-changing switch in series with said source for sending alternating impulses of current from such source through a circuit connected therewith, an inductive device in the circuit, and two spark-gaps and a condenser in the circuit for shortening the current impulses sent through the circuit by the pole-changer and to break the circuit at such gaps to relieve the pole-changer contacts of wear due to arcing.

16. In a system of the class described, a source of current, a condenser, a load device and a pole-changer connected in series with said source, said pole-changer having means to operate the same at any desired speed whereby the terminals of the condenser will be connected alternately in opposite direction to the source of current through the load device.

17. In combination a source of current, a load device and a condenser connected together in series in a circuit, a pole-changer switch in said circuit for breaking said circuit into two parts and re-connecting them in the opposite direction.

18. In combination a source of current, a load device and a condenser connected together in a series circuit, a pole-changer switch for dividing said circuit into two parts and for reconnecting said circuit with the parts reversed with respect to each other, one of said parts containing the source of current and the other of said parts containing the condenser.

19. In combination a source of current, a load device, a condenser and a spark-gap connected together in series relation to a pole-changing switch, said pole-changing switch operable to successively and repeatedly disconnect said circuit into two parts and re-connect said parts in reverse relation with respect to each other.

20. In combination a source of current, a load device, a condenser and a movable spark-gap connected together in series and in circuit through a pole-changing switch, said spark-gap comprising a relatively fixed electrode and movable electrode, said movable electrode connected to said pole-changing switch and means for operating said pole-changing switch and movable electrode in unison whereby the circuit is divided into two parts and re-connected with the parts reversed with respect to each other, said movable electrode being moved simultaneously therewith.

21. In combination a source of uni-directional current, a load device, a static condenser connected together in a circuit in series relation, a pole-changing switch in said circuit, means for operating said pole-changing switch to divide said circuit into two separate parts and for re-connecting said parts together in reverse relation with respect to each other.

22. In combination a source of current, a variable resistance, a load device and an adjustable condenser connected together in series in the circuit and a pole-changing switch and means to operate said switch to disconnect said circuit into two separate parts and for reconnecting said parts together in reverse relation with respect to each other.

23. In combination, a source of current, a load device and a condenser connected together in series in a circuit, a pole-changer switch in said circuit for breaking said circuit into two parts and reconnecting them in the opposite direction, and a spark gap in said circuit to relieve the pole-changer switch contacts of wear due to arcing.

24. In a translating system, a single source of unidirectional current, a pole-changing switch in series with said source, for directing current intermittently and in opposite directions, from said source through a circuit connected therewith, an inductive device in said circuit, and a spark gap and condenser in the circuit for modifying the effect of the intermittent current upon the inductive device, said spark gap adapted to relieve said pole-changing switch of wear due to arcing.

25. In a translating system, a single source of unidirectional current, a pole-changing switch in series with said source for directing current intermittently and alternately in opposite directions from said source through a circuit connected therewith, an inductive device in the circuit and a spark gap and condenser in the circuit for modifying the effect of the intermittent current upon the inductive device, said pole-changing switch being adapted by its operation to vary the length of said spark gap.

26. In a translating system, a single source of unidirectional current, a pole-changing switch connected in series with said source for directing current intermittently and in alternate directions from said source through a circuit connected therewith, an inductive device in said circuit and a spark gap and condenser in the circuit for shortening the current impulses sent through the circuit by the pole-changing switch, such pole-changer adapted by its operation to vary the length of said spark gap to further shorten such impulses.

27. In a translating system, a single source of unidirectional current, a pole-changing switch in series with said source for sending alternating impulses of current from said source through a circuit connected therewith, an inductive device in the circuit, and two spark gaps and a condenser in the circuit for increasing the maximum effect of such inductive device.

28. In a translating system, a single source of unidirectional current, a pole-changing switch in series with said source for sending alternating impulses of current from said source through a circuit connected therewith, an inductive device in the circuit, and two spark gaps and a condenser in the circuit for increasing the maximum effect of said inductive device, one of said spark gaps adapted to be traversed by the positive impulses and the other by the negative impulses of current flowing in the circuit.

29. In a translating system, a single source of unidirectional current, a pole-changing switch for sending alternating impulses of current from said source through a circuit connected therewith, an inductive device in the circuit and two spark gaps and a condenser in the circuit for shortening the current impulses sent through the circuit by the pole changer, one of said spark gaps adapted to be traversed by the positive impulses and the other by the negative impulses of current flowing in said circuit.

30. The method of causing a flow of current from a single source of current through a load device which consists in causing an impulse of current to pass from the source through the load device and flow into a condenser, then breaking the circuit over which said impulse is traveling by means of a spark gap, then causing another impulse of current of opposite character to flow from said same source through said load to said condenser to discharge said condenser of the prior charge and recharge the same with current of said latter nature, and then breaking the circuit traveled by said impulses of current.

31. The method of sending impulses of current from a given source of current through a load device which consists in impressing a potential upon one side of the load device and one plate of a condenser, then causing current to flow from said source of current through said load device to said other plate of the condenser to charge the condenser, then breaking said circuit to stop the flow of current, then causing said source of current to impress a potential substantially equal to said first but in the opposite direction upon said first plate of the condenser and the said side of the load device, then causing a current to flow through said load device to said other plate of the condenser to discharge the condenser of its previous charge and to recharge it with the latter character of current, and then opening the circuit to stop the flow of current.

32. The method of causing current to flow through a load device which consists in impressing the voltage of a single source of current upon the load device, and a condenser in series to charge the condenser through said load, then breaking said series circuit to stop the flow of current, then reversing the polarity of said source with respect to said condenser and load device, and recharging said condenser in the opposite direction through said load device, and then again breaking said series circuit to stop the flow of current.

In witness whereof, I hereunto subscribe my name this 15th day of May, A. D. 1915.

JAMES G. ZIMMERMAN,
*Administrator for Clarence I. Zimmerman.*

Copies of this patent may be obtained for five cents each, by addressing the "Commissioner of Patents, Washington, D. C."